United States Patent
Balasubramanian et al.

(10) Patent No.: US 8,467,784 B2
(45) Date of Patent: Jun. 18, 2013

(54) WLAN SYSTEM SCANNING AND SELECTION

(75) Inventors: Srinivasan Balasubramanian, San Diego, CA (US); Anup Kuzhiyil, San Diego, CA (US); Amit Gil, San Diego, CA (US); Lalit Yerramilli Raju, San Diego, CA (US); Luiza Timariu, San Diego, CA (US); Saravana Krishnan Kannan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 601 days.

(21) Appl. No.: 11/694,213

(22) Filed: Mar. 30, 2007

(65) Prior Publication Data

US 2008/0014934 A1 Jan. 17, 2008

Related U.S. Application Data

(60) Provisional application No. 60/831,021, filed on Jul. 14, 2006.

(51) Int. Cl.
*H04W 4/00* (2009.01)
*H04B 7/00* (2006.01)

(52) U.S. Cl.
USPC ............................ 455/434; 455/515; 370/338

(58) Field of Classification Search
USPC ..... 455/552.1, 553.1, 418–422.1, 432.1–444, 455/456.1–456.6, 13.4, 550.1, 556.1, 556.2, 455/571–574, 127.1–127.5, 343.1–343.6, 455/455, 464, 522, 557, 515, 516; 370/310.2, 370/328, 338, 331–333, 351–356, 10.2
See application file for complete search history.

(56) References Cited

U.S. PATENT DOCUMENTS

| 5,128,959 | A | | 7/1992 | Bruckert | |
|---|---|---|---|---|---|
| 5,987,012 | A | * | 11/1999 | Bruckert et al. | ............... 370/331 |
| 7,046,647 | B2 | * | 5/2006 | Oba et al. | ....................... 370/331 |

(Continued)

FOREIGN PATENT DOCUMENTS

| EP | 0899906 A2 | 3/1999 |
|---|---|---|
| EP | 1542400 A2 | 6/2005 |

(Continued)

OTHER PUBLICATIONS

International Search Report and Written Opinion—PCT/US2007/073515, International Search Authority—European Patent Office—Mar. 26, 2008.

*Primary Examiner* — San Htun
(74) *Attorney, Agent, or Firm* — Kevin T. Cheatham

(57) ABSTRACT

Techniques for performing WLAN system scanning and selection are described. A terminal performs multiple iterations of scan to detect for WLAN systems. A scan list containing at least one WLAN system to detect for is initially determined. For each scan iteration, a scan type may be selected from among the supported scan types. The selected scan type may indicate passive scan or active scan, frequency channels to scan, etc. A scan may be performed based on the selected scan type. Signal strength measurements are obtained for access points received during the scan and used to identify detected access points. After all scan iterations are completed, candidates access points are identified based on the scan results, e.g., based on the signal strength measurements for the detected access points and a detection threshold. The best candidate access point may be selected for association by the terminal.

27 Claims, 7 Drawing Sheets

U.S. PATENT DOCUMENTS

| | | | |
|---|---|---|---|
| 7,116,979 B2* | 10/2006 | Backes et al. | 455/434 |
| 7,602,757 B2* | 10/2009 | Jeong et al. | 370/338 |
| 2004/0039817 A1* | 2/2004 | Lee et al. | 709/225 |
| 2004/0043767 A1 | 3/2004 | Tsutsumi et al. | |
| 2004/0082327 A1 | 4/2004 | Kim et al. | |
| 2004/0214539 A1 | 10/2004 | Rajamani et al. | |
| 2004/0259503 A1 | 12/2004 | Ogura | |
| 2005/0096053 A1* | 5/2005 | Liu et al. | 455/439 |
| 2005/0128988 A1* | 6/2005 | Simpson et al. | 370/338 |
| 2005/0153692 A1* | 7/2005 | Hwang et al. | 455/434 |
| 2006/0014537 A1* | 1/2006 | Arai et al. | 455/435.1 |
| 2006/0135066 A1 | 6/2006 | Banerjea | |
| 2007/0060211 A1* | 3/2007 | Abdel-Kader | 455/572 |
| 2007/0105552 A1* | 5/2007 | Hun et al. | 455/434 |
| 2007/0110093 A1* | 5/2007 | Tang | 370/450 |

FOREIGN PATENT DOCUMENTS

| | | |
|---|---|---|
| JP | 10084572 A | 3/1998 |
| JP | 2004088592 A | 3/2004 |
| JP | 2005252446 A | 9/2005 |
| WO | WO9119403 A1 | 12/1991 |
| WO | WO2004061700 A1 | 7/2004 |
| WO | WO2005050965 A1 | 6/2005 |

* cited by examiner

WLAN SYSTEM SCANNING AND SELECTION

The present application claims priority to provisional U.S. Application Ser. No. 60/831,021 entitled "WLAN System Selection," filed Jul. 14, 2006, assigned to the assignee hereof and incorporated herein by reference.

BACKGROUND

I. Field

The present disclosure relates generally to communication, and more specifically to techniques for scanning and selecting wireless local area network (WLAN) systems.

II. Background

WLAN systems are widely deployed to support wireless communication for terminals, which may be computers, cellular phones, etc. WLAN systems are deployed in various locations such as office buildings, coffee shops, malls, airport terminals, schools, and other hot spots where data usage is expected to be high. WLAN systems allow terminals to obtain data connectivity (e.g., to connect to the Internet) from virtually anywhere in the world.

Many WLAN systems implement IEEE 802.11, which is a family of standards offered by The Institute of Electrical and Electronics Engineers (IEEE). The IEEE 802.11 standards specify the radio interface between access points and terminals and also between terminals. Currently, 802.11a, 802.11b and 802.11g standards are widely used. Each IEEE 802.11 standard specifies operation at a specific frequency band (e.g., 2.4 GHz or 5 GHz) using one or more modulation techniques.

A terminal may be configured to search for WLAN systems whenever the terminal is powered on. The terminal may not know its location or which WLAN systems are near its vicinity. It is desirable to detect for WLAN systems that are within range and to select a suitable WLAN system for possible communication as reliably and efficiently as possible.

SUMMARY

Techniques for performing WLAN system scanning and selection are described herein. In an aspect, a terminal performs multiple iterations of scan to detect for WLAN systems. The multiple scan iterations may be used to obtain more accurate measurements for access points. The multiple scan iterations may also be used to support different types of scan (e.g., passive scan and active scan), scanning of different frequency channels, scanning for different WLAN systems, etc.

In one design, a scan list containing at least one WLAN system to detect for is initially determined. The scan list may be selected from a preferred list of WLAN systems configured on the terminal. Multiple scan iterations are then performed to detect for access points in the WLAN system(s) in the scan list.

For each scan iteration, a scan type may be selected from among the supported scan types. The selected scan type may indicate passive scan or active scan, at least one frequency channel to scan, etc. Passive scan may be performed for any scan iteration regardless of the current location of the terminal, and active scan may be performed if permitted for the current location. A scan may then be performed based on the selected scan type. Signal strength measurements may be obtained for access points received by the terminal during the scan and used to identify detected access points. For example, a received access point may be declared as a detected access point if its measured signal strength or filtered signal strength exceeds a detection threshold.

After all scan iterations are completed, access points that are candidates for association are identified based on the scan results. For example, a detected access point may be declared as a candidate access point if its filtered signal strength exceeds a selection threshold. The detection and selection thresholds may be fixed or variable values. A candidate access point (e.g., with the highest filtered signal strength) may then be selected for association by the terminal.

Various aspects and features of the disclosure are described in further detail below.

DETAILED DESCRIPTION

The techniques described herein may be used for various WLAN systems including WLAN systems that implement IEEE 802.11, WLAN systems that implement Hiperlan, etc. IEEE 802.11 is commonly used in the United States, Japan and many other countries. Hiperlan is a WLAN radio technology that is commonly used in Europe. For clarity, certain aspects of the techniques are described below for WLAN systems that implement IEEE 802.11.

Figure 1:
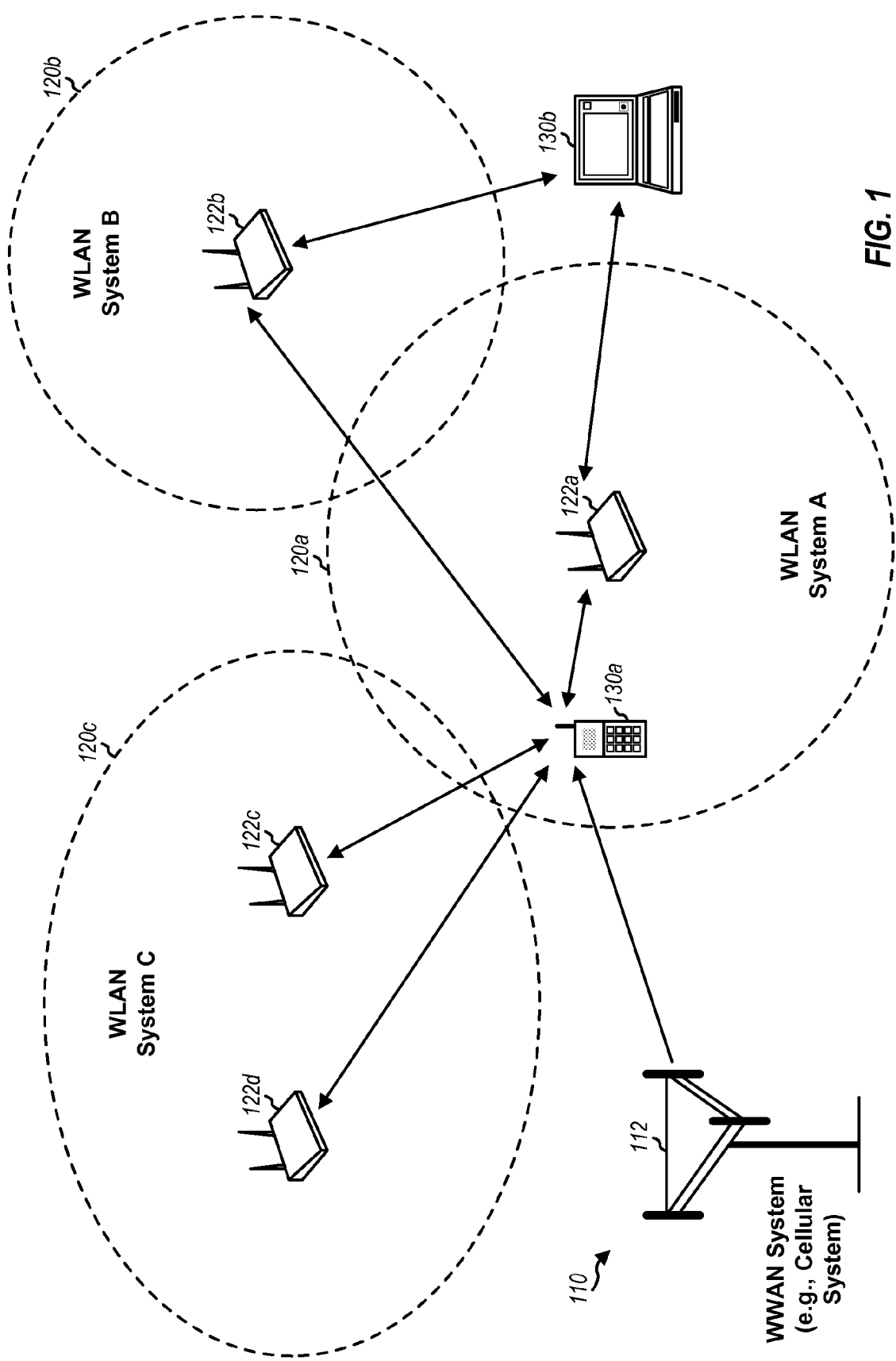
FIG. 1 shows a wireless wide area network (WWAN) and WLAN systems.

FIG. 1 shows an example deployment of a WWAN 110 and three WLAN systems 120a, 120b and 120c. A WWAN is a wireless network that provides communication coverage for a large geographic area such as, e.g., a city, a state, or an entire country. WWAN 110 may be a cellular network such as (a) a Code Division Multiple Access (CDMA) network that implements IS-95, IS-2000, IS-856 and/or some other CDMA standard, (b) a Universal Mobile Telecommunication System (UMTS) network that implements Wideband-CDMA (W-CDMA), (c) a Global System for Mobile Communications (GSM) network, or (d) some other cellular network. WWAN 110 may also be a broadcast network or some other type of wireless network. WWAN 110 typically includes many base stations 112 that support communication for terminals within the coverage area of the WWAN. For simplicity, only one base station 112 is shown in FIG. 1. A base station is generally a fixed station that communicates with the terminals and may also be called a Node B, a base transceiver station (BTS), etc.

WLAN systems 120 provide communication coverage for medium geographic areas such as, e.g., buildings, malls, shops, schools, etc. Each WLAN system 120 may include any number of access points that support wireless communication for any number of terminals. In FIG. 1, WLAN system 120a includes one access point 122a, WLAN system 120b includes one access point 122b, and WLAN system 120c includes two access points 122c and 122d. Each WLAN system 120 may be identified by a service set identifier (SSID), which is an alphanumeric string that may be up to 32 bytes long. Each access point 122 may perform coordination function for a basic service set (BSS), which is a set of terminals associated with that access point. Each BSS may be identified by a BSS identifier (BSSID), which is a 48-bit Medium Access Control (MAC) address. Each access point may thus be identified by a unique BSSID. A terminal may associate with an access point by exchanging Association Request and Association Response frames with the access point. After successful association, the terminal is connected to the WLAN system in which the access point belongs.

WLAN systems 120 may implement one or more IEEE 802.11 standards and may be deployed in any part of the world. 802.11b and 802.11g operate in the 2.4 GHz band and divide the frequency spectrum from 2400 to 2495 MHz into 14 staggered and overlapping frequency channels, which are numbered as channels 1 through 14. Different frequency channels are available for use in different regulatory domains. A regulatory domain may regulate IEEE 802.11 operation for one or more countries. For example, frequency channels 1 through 11 are supported in the United States and Canada, frequency channels 10 and 11 are supported in Spain, frequency channels 10 through 13 are supported in France, frequency channels 1 through 13 are supported in the rest of Europe, and frequency channels 1 to 14 are supported in Japan. Different regulatory domains may also impose different constraints on maximum output power from a station, which may be an access point or a terminal.

Figure 2:
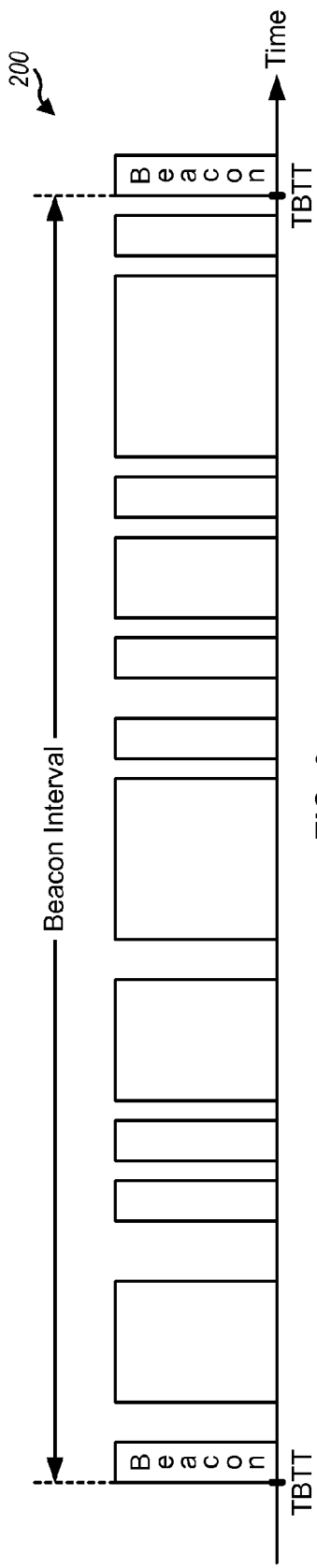
FIG. 2 shows a transmission timeline for an access point.

FIG. 2 shows an example transmission timeline 200 for an access point, which may be any one of the access points in FIG. 1. The access point periodically transmits a beacon frame that carries various types of information for its WLAN system. The beacon frame is transmitted at a target beacon transmit time (TBTT). The time interval between TBTTs typically includes a contention free period (CFP) in which only one station transmits on the wireless channel at any given moment and a contention period (CP) in which more than one station may transmit simultaneously on the wireless channel.

Figure 3:
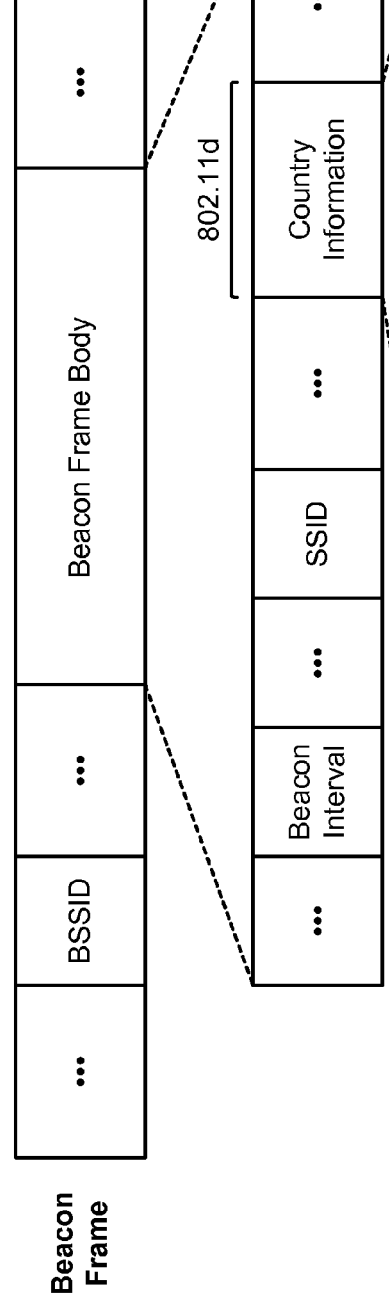
FIG. 3 shows a beacon frame transmitted periodically by the access point.
Figure 3:
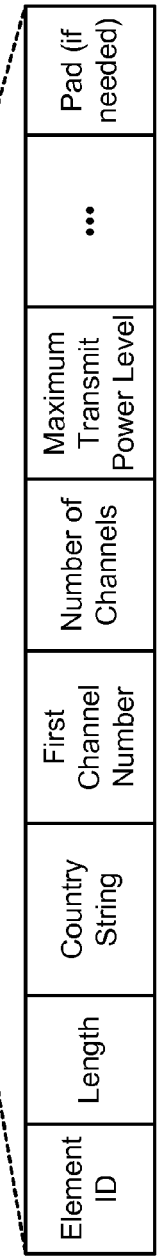

FIG. 3 shows the format of the beacon frame that is transmitted periodically by the access point. The beacon frame includes a BSSID field that carries the BSSID for the BSS covered by the access point, a beacon frame body, and other fields that are not shown in FIG. 3 for simplicity. The beacon frame body includes a Beacon Interval field that indicates the time duration between TBTTs, an SSID field that carries the SSID for the WLAN system in which the access point belongs, and other information elements. The beacon interval may be 100 milliseconds (ms) or some other time interval.

In 802.11d, a beacon frame may include a Country Information element. This information element may include a Country String field that indicates the country in which the access point is located, a First Channel Number field that indicates the lowest channel number in a subband described by the information element, a Number of Channels field that indicates the number of frequency channels in the subband, and a Maximum Transmit Power Level field that indicates the maximum power allowed to be transmitted. One set of First Channel Number, Number of Channels, and Maximum Transmit Power Level fields may be provided for each subband, which is a block of consecutive frequency channels that is not contiguous with another block of frequency channels.

Referring back to FIG. 1, terminals may be dispersed throughout WWAN 110 and WLAN systems 120. A terminal may be capable of communicating with one or more wireless networks and may also be capable of communicating peer-to-peer with another terminal. In the example shown in FIG. 1, a terminal 130a can communicate with both WWAN 110 and WLAN systems 120, and a terminal 130b can communicate with just WLAN systems 120. A terminal may thus be a WWAN device as well as a WLAN station (e.g., terminal 130a) or just a WLAN station (e.g., terminal 130b). A terminal may also be called a mobile station, an access terminal, a user terminal, a user equipment, a mobile equipment, a station, a subscriber unit, etc. A terminal may be a cellular phone, a laptop computer, a wireless communication device, a personal digital assistant (PDA), a wireless modem, a handset, etc.

A terminal (e.g., terminal 130a or 130b in FIG. 1) may support various operating states. Each operating state may be reached based on one or more conditions and may be associated with specific actions to be performed in that state.

Figure 4:
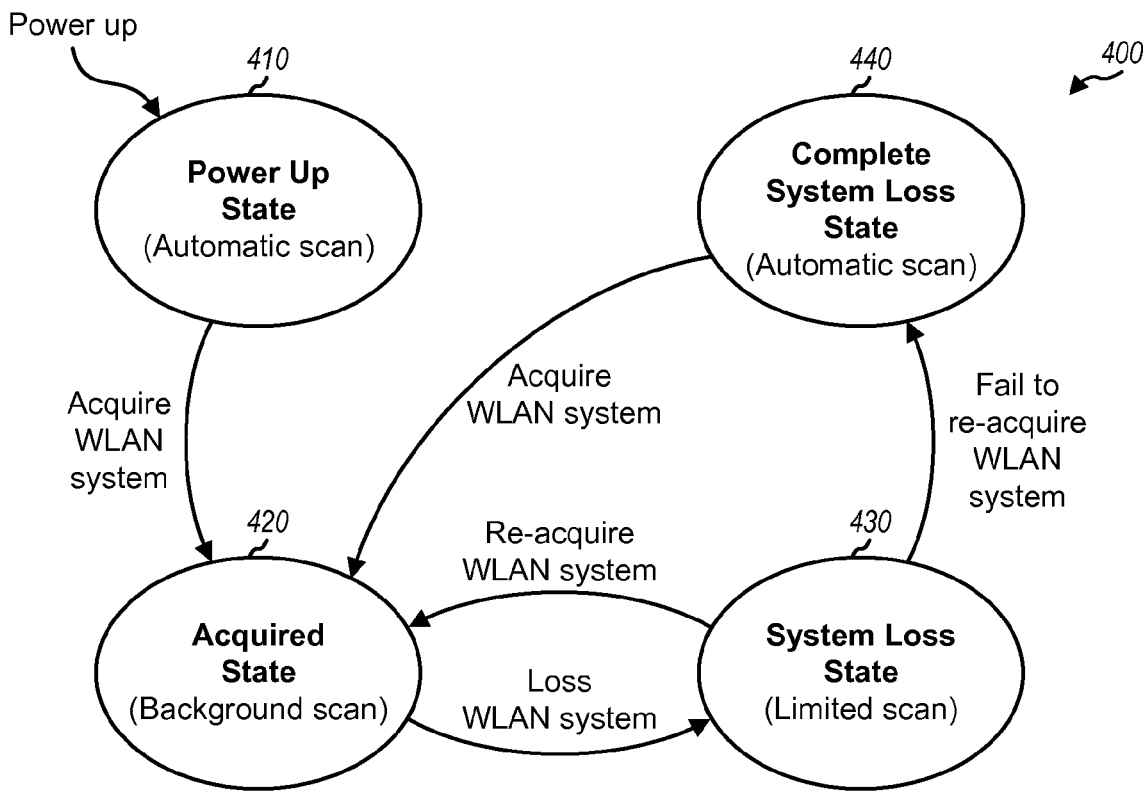
FIG. 4 shows a set of operating states for a terminal.

FIG. 4 shows a state diagram 400 for a set of operating states for the terminal, in accordance with one design. In this design, the operating states include a power up state 410, an acquired state 420, a system loss state 430, and a complete system loss state 440. The terminal enters power up state 410 upon being powered up. In state 410, the terminal may perform automatic scan to detect for available WLAN systems and to acquire a WLAN system for possible communication. The terminal may transition to acquired state 420 upon successful association with an access point in the acquired WLAN system. In state 420, the terminal may periodically perform background scan to detect for other access points in the same WLAN system for possible handoff, if necessary.

The terminal may transition to system loss state 430 upon losing the acquired WLAN system. In state 430, the terminal may perform limited scan and attempt to re-acquire the previously acquired WLAN system a particular number of times before declaring complete system loss. The terminal may return to acquired state 420 upon re-acquiring the previously acquired WLAN. The terminal may transition to complete system loss state 440 if it is unable to re-acquire the previously acquired WLAN system after the particular number of attempts. In complete system loss state 440, the terminal may perform automatic scan to detect for available WLAN systems. The terminal may transition to acquired state 420 upon detecting and acquiring a WLAN system.

As shown in FIG. 4, the terminal may perform different scans in different operating states. The terminal may also scan for different WLAN systems and/or perform scan in different manners in different operating states. For example, in power up state 410, the terminal may scan for any available WLAN system. In system loss state 430, the terminal may scan for WLAN systems that are more likely to be found, e.g., WLAN systems that the terminal has detected or acquired recently. In complete system loss state 440, the terminal may scan for any available WLAN system but may perform scan at less frequent intervals in order to conserve battery power.

The terminal may also support various operating modes such as an idle mode and an in-traffic mode, e.g., while in acquired state 420. The terminal may be in the idle mode if it has not exchanged data with any access point for an extended period of time. The terminal may enter the idle mode after association with an access point. The terminal may be in the in-traffic mode if it is exchanging data with the associated access point. In both the idle and in-traffic modes, the terminal may periodically scan for other access points in the same WLAN system for possible handoff.

The terminal may perform automatic scan, manual scan, background scan, limited scan and/or other scan to detect for WLAN systems. The terminal may perform automatic scan upon being powered on (e.g., in power up state 410) and may also periodically perform automatic scan when no WLAN systems are acquired (e.g., incomplete system loss state 440). A goal of the automatic scan may be to find a suitable WLAN system for possible communication. The terminal may perform manual scan whenever requested by a user. A goal of the manual scan may be to return a comprehensive list of all WLAN systems detected by the terminal to the user. The terminal may perform background and limited scans to detect for one or more specific WLAN systems. The terminal may perform background scan as background tasks, secondary to other communication tasks.

The terminal may maintain various lists and sets to facilitate WLAN system scanning and selection. The terms "list" and "set" may be used interchangeably. For clarity, the term "list" is used for WLAN systems, and the term "set" is used for access points in the description below. These various lists and sets may be preconfigured at the terminal and/or formed during operation.

Figure 5:
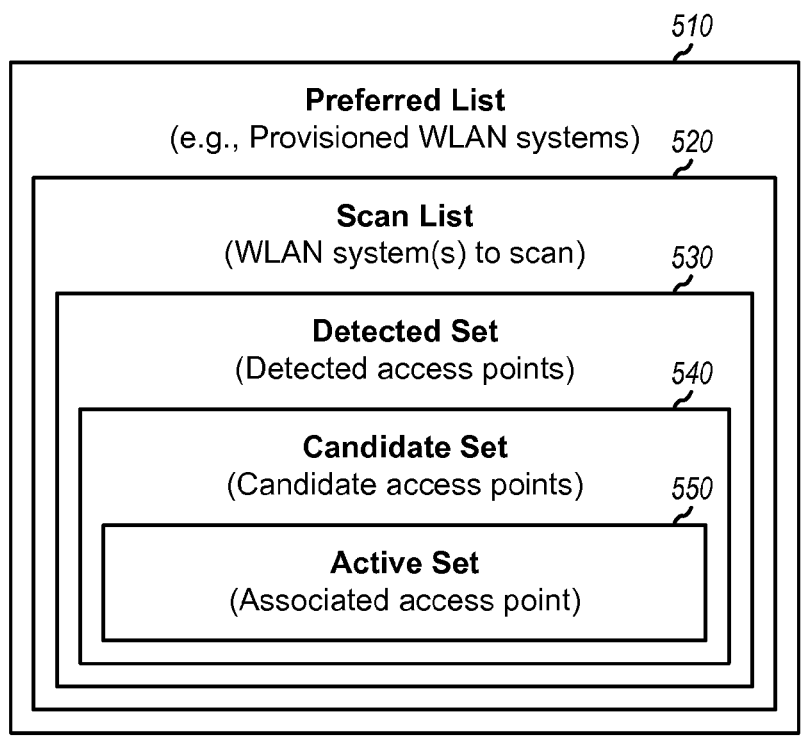
FIG. 5 shows various lists of WLAN systems and sets of access points.

FIG. 5 shows various lists and sets in accordance with one design. The terminal may be configured with a preferred list 510 by a service provider, the user, etc. Preferred list 510 may include WLAN systems owned and operated by the service provider, WLAN systems for which the service provider has roaming agreement, WLAN systems covered by a service subscription, WLAN systems programmed or selected by the user, etc. Preferred list 510 may also be referred to as a netlist, a roaming list, etc. In one design, preferred list 510 includes all WLAN systems that may be acquired during automatic scan. Preferred list 510 may include one record for each WLAN system in the list. Each record may include pertinent information for its WLAN system such as SSID, authentication information (e.g., key, password, etc.), priority, frequency channel information, etc. A scan list 520 includes one or more WLAN systems to detect for in a given scan event. Scan list 520 may be formed based on preferred list 510, as described below.

A detected set 530 includes access points detected by the terminal. For automatic scan, the access points in detected set 530 may be restricted to be from WLAN systems in preferred list 510. A candidate set 540 includes access points in detected set 530 that meet one or more criteria and are candidates for association by the terminal. An active set 550 includes one or more access points (typically one access point) that the terminal has associated with.

The terminal may perform passive scan and/or active scan to detect for access points. For passive scan, the terminal listens for beacon frames transmitted by access points in WLAN systems. These beacon frames carry the BSSIDs for the transmitting access points and may further carry the SSIDs for the WLAN systems in which the access points belong, as shown in FIG. 3. The terminal may thus be able to identify both access points and WLAN systems based on the received beacon frames. Passive scan typically consumes more battery power but does not require regulatory information. The terminal may thus perform passive scan at any time and in any location.

For active scan, the terminal transmits a Probe Request frame and listens for Probe Response frames to detect for access points. Active scan may be used to discover "hidden" access points, which are access points that do not include the SSID in their beacon frames. Active scan typically consumes less battery power but requires the terminal to have regulatory information so that the Probe Request frame can be transmitted in accordance with regulatory requirements. Different regulatory domains may impose different requirements on the frequency channels on which a WLAN system can operate as well as the maximum output power level for stations. In order to comply with the requirements of all regulatory domains, the terminal may perform active scan when regulatory information is available and may perform passive scan when such information is unavailable.

In an aspect, the terminal performs multiple iterations of scan to detect for WLAN systems. The terminal may receive beacon frames and/or other frames from access points and may make received signal strength indicator (RSSI) measurements on the received frames. The RSSI measurements may also be referred to as signal strength measurements, signal measurements, pilot measurements, received power measurements, etc. The measurements for a given access point may fluctuate widely, e.g., due to changes in the wireless environment. The multiple scan iterations may be used to obtain more accurate measurements for access points. The multiple scan iterations may also be used to support different types of scan (e.g., passive scan for some iterations and active scan for other iterations), scanning of different frequency channels, scanning for different WLAN systems, etc.

Figure 6:
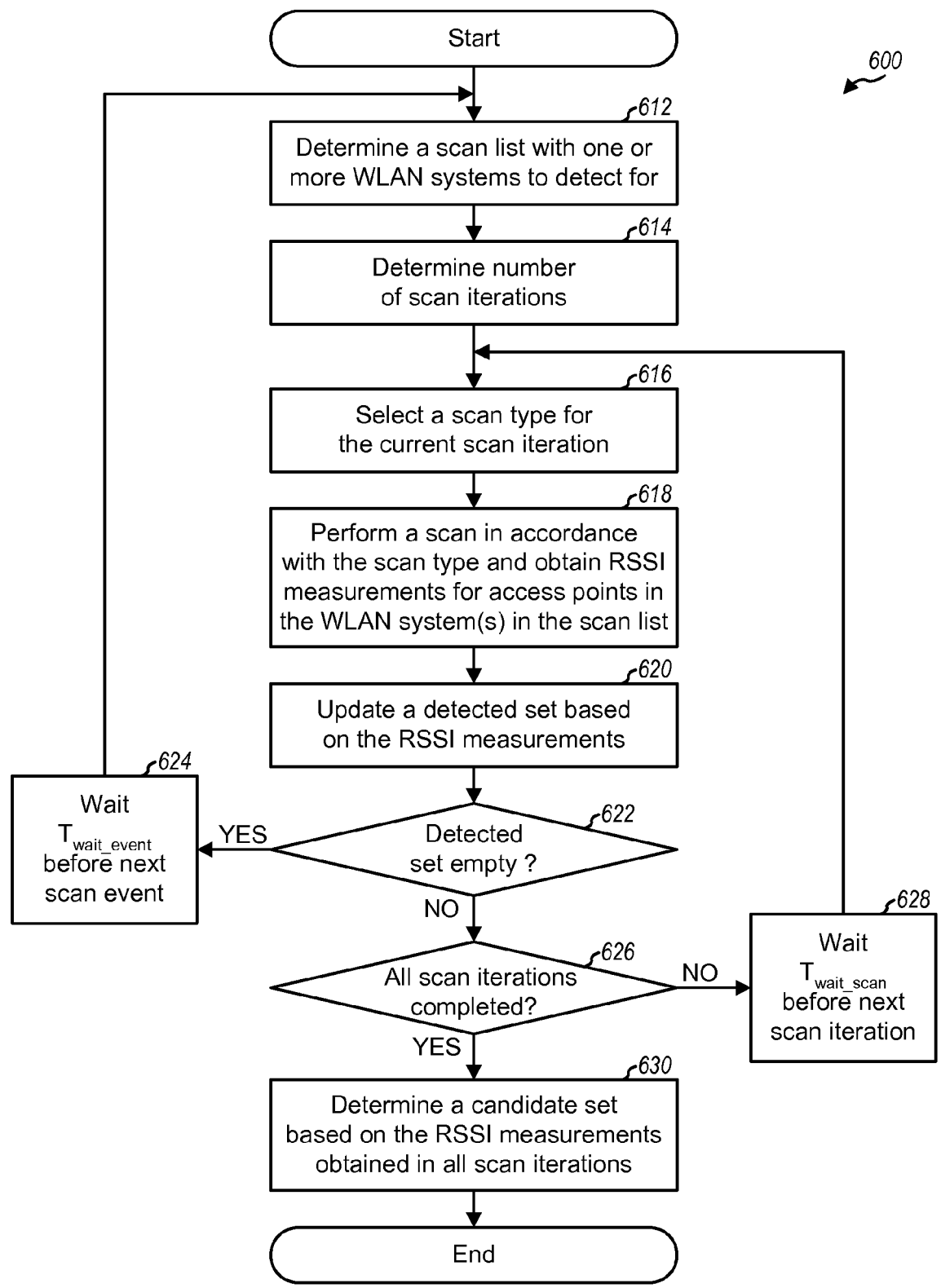
FIG. 6 shows a process for performing automatic scan.

FIG. 6 shows a process 600 for performing automatic scan to detect for WLAN systems. At the start of a new scan event, a scan list containing one or more WLAN systems to detect for is determined, as described below (block 612). The number of scan iterations may also be determined and denoted as $N_{scan}$ (block 614). The number of scan iterations may be a fixed value (e.g., 5, 10, etc.) or a variable/configurable value that may be dependent on various factors such as the scan results, the desired search speed, the available battery power, etc. Performing multiple scan iterations may ensure that a WLAN system is stable before acquisition is attempted.

For each scan iteration, a scan type is selected from among all supported scan types, as described below (block 616). A scan is then performed in accordance with the scan type, and RSSI measurements are obtained for access points received by the terminal and belonging in the WLAN system(s) in the scan list (block 618). Passive scan for a given frequency channel may be performed by (a) tuning to the frequency channel, (b) listening for beacon frames from access points for a particular time duration (e.g., 130 ms or some other duration longer than the beacon interval), (c) making RSSI measurements on received beacon frames, and (d) processing the received beacon frames to identify the transmitting access points and their WLAN systems. Active scan for a given frequency channel may be performed by (a) tuning to the frequency channel, (b) sending a Probe Request frame, (c) listening for Probe Response frames from access points for a particular time duration, (d) making RSSI measurements on received Probe Response frames, and (e) processing the received Probe Response frames to identify the transmitting access points and their WLAN systems. Passive and active scans may also be performed in other manners.

A detected set of access points is updated based on the RSSI measurements obtained from the scan, as described below (block 620). A determination is then made whether the detected set is empty (block 622). If the answer is 'Yes', which means that no access points were detected in the last scan iteration or all prior scan iterations, then the current scan event may be aborted. The terminal may wait a particular amount of time $T_{wait\_event}$ (block 624) and then return to block 612 to start a new scan event.

If the detected set is not empty and the answer is 'No' for block 622, then a determination is made whether all scan iterations are completed (block 626). If the answer is 'No', then the terminal waits a predetermined amount of time $T_{wait\_scan}$ (block 628) and then returns to block 616 for the next scan iteration. The wait time $T_{wait\_scan}$ may be sufficiently long to obtain independent measurements but sufficiently short to reduce delay in performing automatic scan.

$N_{scan}$ may be a fixed value, in which case $N_{scan}$ scan iterations may be performed regardless of the scan results. $N_{scan}$ may also be a variable value that may be dependent on the scan results. For example, if strong RSSI measurements are obtained, then the number of scan iterations may be reduced to shorten scan time while providing reliable results. Thus, block 626 may entail determining or revising the number of scan iterations to perform. If all scan iterations are completed and the answer is 'Yes' for block 626, then a candidate set is determined based on the RSSI measurements obtained in all scan iterations (block 630).

A scan list may be determined for each scan event in block 612 in FIG. 6. In general, the scan list may include any number of WLAN systems and any WLAN system. In one design, the scan list is set to the preferred list. In another design, the scan list includes one WLAN system or a subset of the WLAN systems in the preferred list. For example, the WLAN systems in the preferred list may be assigned different priorities, and the scan list may include one or more WLAN systems with the same priority. As another example, the scan list may include one or more WLAN systems that are more likely to be detected or have not been scanned. Different scan lists (e.g., for different priorities) may be used for different scan events. In yet another design, the scan list includes WLAN systems that have been detected or acquired recently.

A scan event covers multiple scan iterations for a given scan list. The preferred list may be partitioned into multiple scan lists (e.g., for different priorities), and multiple scan events may be performed for the multiple scan lists. A full scan may cover the entire preferred list and/or other WLAN systems and may be performed with one or more scan events. If a suitable WLAN system is not detected after a full scan, then the terminal may wait a particular wait time $T_{wait\_fs}$ and then perform another full scan. $T_{wait\_fs}$ may be a fixed value, in which case the full scan may be performed at regular intervals. $T_{wait\_fs}$ may also be an increasing value (e.g., an exponentially increasing value), in which case the full scan may be performed at progressively longer intervals (or less frequently).

As noted above, the terminal may perform passive scan at any time and in any location and may perform active scan only if permitted by the regulatory domain governing the current location of the terminal. Upon power up, the terminal may not know its current location or the applicable regulatory domain. The terminal may ascertain the regulatory domain in various manners.

Figure 7:
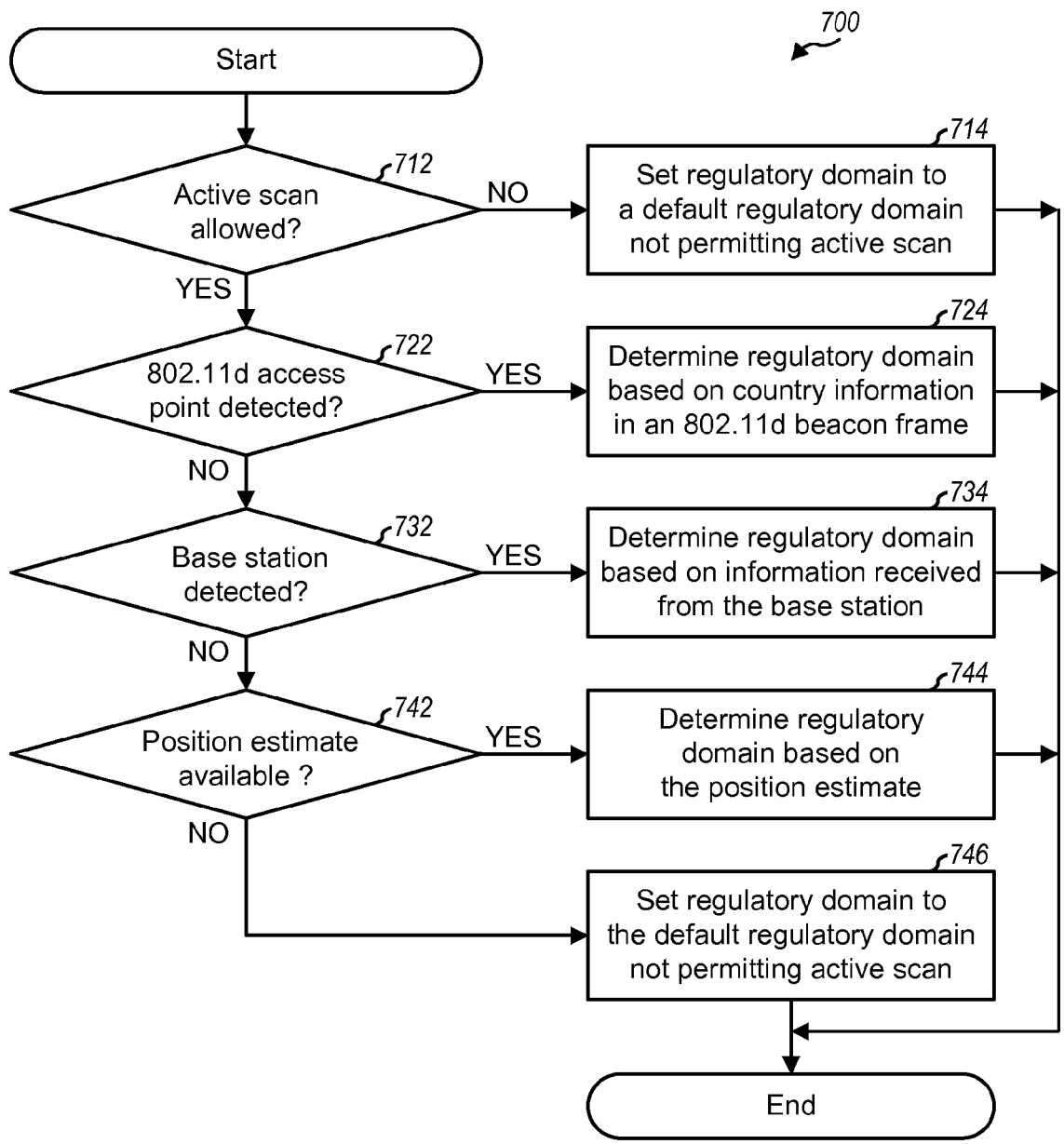
FIG. 7 shows a process for determining regulatory domain.

FIG. 7 shows a process 700 for determining the regulatory domain for the terminal's current location. Process 700 may be performed prior to the first scan iteration, after the first scan iteration, after each scan iteration, etc.

Initially, a determination is made whether the terminal is allowed to perform active scan, e.g., based on a parameter that may be provisioned on the terminal by a service provider (block 712). If the answer is 'No', then the regulatory domain may be set to a default regulatory domain that does not permit active scan (block 714), and the process then terminates.

If active scan is allowed, then a determination is made whether any access point detected in a prior passive scan supports 802.11d (block 722). One or more passive scan iteration may be performed (e.g., in block 618 in FIG. 6) to detect for access points. If any detected access point supports 802.11d, then the regulatory domain may be determined based on country information in a beacon frame (as shown in FIG. 3) received from the 802.11d access point (block 724), and the process then terminates.

If no 802.11d access points are detected, then a determination is made whether any base station in a cellular system or a broadcast system is detected (block 732). If the answer is 'Yes', then the regulatory domain may be determined based on information received from the base station (block 734), and the process then terminates.

If no base stations are detected, then a determination is made whether a position estimate is available for the terminal, e.g., based on measurements for satellites, base stations, and/or other transmitters (block 742). If the answer is 'Yes', then the regulatory domain may be determined based on the position estimate (block 744), and the process then terminates. If no information is available to determine the regulatory domain, then the regulatory domain may be set to the default regulatory domain (block 746), and the process then terminates.

The terminal may obtain country information based on a Mobile Country Code (MCC) broadcast by a base station in a cellular network. The MCC is defined by the International Telecommunications Union (ITU) as a 3-digit code that identifies the country in which a cellular network is deployed. Each country is assigned one or more unique MCC values by the ITU in Recommendation E.212, which is publicly available. For example, the United States is assigned MCC values of 310 through 316 (decimal). The MCC is broadcast in different manners by different cellular networks.

For a CDMA network that implements cdma2000, which covers IS-95, IS-2000, and IS-856, each base station broadcasts a Network Operator Identifier that is composed of an MCC and a Network Operator Code (NOC). A base station may broadcast the MCC in a Sync Channel Message on a sync channel or a System Parameters Message or an Extended System Parameters Message on a paging channel. For a GSM network, each base station regularly broadcasts a System Information Type 3 message carrying a Location Area Identification information element that contains a 3-digit MCC value and a 3-digit Mobile Network Code (MNC). For a UMTS network, each base station regularly broadcasts a System Information message carrying a Master Information block that contains a PLMN Identity for a Public Land Mobile Network (PLMN) in which the UMTS network belongs. The PLMN Identity is composed of a 3-digit MCC value and a 2 or 3-digit MNC value for the PLMN.

The terminal may obtain country information from a base station in a cellular network prior to performing the first scan iteration and may determine the regulatory domain based on the country information. The terminal may then perform active scan in the first scan iteration, if permitted by the regulatory domain. The terminal may also perform one iteration of passive scan to detect for access points. If any 802.11d access point is detected, then the terminal may obtain country information from the 802.11d access point and determine the regulatory domain based on the country information. The terminal may then perform active scan in subsequent scan iterations, if permitted by the regulatory domain. In general, the terminal may determine regulatory domain prior to or after performing the first scan iteration.

The terminal may initialize the regulatory domain to the default regulatory domain (which does not permit active scan) at power up. The terminal may update the regulatory domain whenever country information is available, e.g., whenever an 802.11d access point or a base station is detected. The terminal may select the scan type for each iteration based on the regulatory domain. The terminal may maintain a table of different regulatory domains or country/region codes along with the applicable regulatory restrictions and frequency channels. The terminal may use active scan in regions where active scan is permitted and may perform active scan in accordance with the applicable regulatory restrictions on the specified frequency channels. The terminal may perform only passive scan if active scan not permitted or the regulatory domain or country/region for the current location is not known.

Various scan types may be defined based on passive scan and active scan, frequency channels, and/or other factors. For example, the following scan types may be supported:

- Passive scan of all frequency channels,
- Passive scan of non-overlapping frequency channels,
- Passive scan of odd numbered frequency channels,
- Passive scan of even numbered frequency channels,
- Passive scan of frequency channels for entries in the preferred list,
- Passive scan of non-overlapping frequency channels for entries in the preferred list,
- Active scan of all frequency channels,
- Active scan of odd numbered frequency channels,
- Active scan of even numbered frequency channels,
- Active scan of frequency channels for entries in the preferred list, and
- Active scan of non-overlapping frequency channels for entries in the preferred list.

Other scan types may also be supported. The scan types available for use may be all or a subset of the supported scan types and may be dependent on regulatory domain and/or other factors. In one design, a scan type may be selected for each scan iteration, and different scan types may be selected for different scan iterations, as shown in FIG. 6.

The detected set contains access points detected by the terminal in the multiple scan iterations for a scan event. The detected set may be updated based on RSSI measurements, filtered measurements obtained by filtering the RSSI measurements as described below, and/or other information. The detected set may be updated in various manners after each scan iteration in block 620 in FIG. 6.

In one design, the detected set is updated after each scan iteration based on the RSSI measurements obtained in that scan iteration. A record may be created for each scan iteration and may include all access points with RSSI measurements above a detection threshold in that scan iteration. The detected set may then include $N_{scan}$ records for $N_{scan}$ scan iterations. These records may be used to determine which access points are detected in each scan iteration, and how often a given access point has been detected in the $N_{scan}$ scan iterations.

In another design, all access points with filtered measurements above the detection threshold are included in the detected set. The filtered measurement for each access point may be updated after each scan iteration and used to determine whether or not to include the access point in the detected set for that scan iteration.

The detection threshold may be a fixed value. If the detection threshold is set to zero, then all received access points are included in the detected set regardless of their RSSI measurements. The detection threshold may also be a variable value that may be dependent on the scan iteration, as follows:

$$TH_{det,i} = \max\{TH_{det\_min}, TH_{det,i-1} - TH_{det\_step} \times (i-1)\}, \quad \text{Eq (1)}$$

where $TH_{det,i}$ is a detection threshold used to include access points in the detected set in the i-th scan iteration, $TH_{det\_step}$ is a step size, and $TH_{det\_min}$ is a minimum detection threshold.

In equation (1), $TH_{det,i}$ may be set to $TH_{det\_init}$ for the first scan iteration, may be reduced by $TH_{det\_step}$ for each subsequent scan iteration, and may be limited to be greater than or equal to $TH_{det\_min}$. The $TH_{det}$ threshold may also be set in other manners.

The detected set may also be updated in other manners. The access points in the detected set may be ordered after each scan iteration based on their RSSI or filtered measurements. Up to $N_{ap}$ access points with the highest measurements may be retained in the detected set after each scan iteration, where $N_{ap}$ may be any value.

The candidate set may be determined after all $N_{scan}$ scan iterations are completed in block 630 in FIG. 6. The access points in the detected set may be considered for inclusion in the candidate set based on various factors such as the RSSI measurements, the number of scan iterations in which the access points are included in the detected set, etc. For example, access points that are not included in the detected set for at least $N_{min}$ scan iterations and/or for at least $N_{con}$ consecutive scan iterations may be omitted from consideration for the candidate set, where $N_{min}$ and $N_{con}$ may each be any value from 1 to $N_{scan}$, e.g., $1 \leq N_{cons} \leq N_{min} \leq N_{scan}$. Access points that are not omitted may be considered for inclusion in the candidate set based on various criteria.

In one design, access points in the detected set with filtered measurements exceeding a fixed selection threshold are included in the candidate set. This selection threshold may be any suitable value, e.g., −70, −75, −80 dB or some other value.

In another design, access points with filtered measurements exceeding a variable selection threshold are included in the candidate set. The variable selection threshold may be set as follows:

$$TH_{sel}(m) = TH_{sel\_init} - TH_{sel\_step} \times (N_m - 1) \quad \text{Eq (2)}$$

where $TH_{sel}(m)$ is a selection threshold used to add access point m to the candidate set, $TH_{sel\_init}$ is an initial selection threshold, $TH_{sel\_step}$ is a step size, and $N_m$ is the number of scan iterations in which access point m has been detected and included in the detected set.

In equation (2), $TH_{sel}(m)$ may be set to $TH_{sel\ init}$ if access point m has been detected in only one scan iteration and may be reduced by $TH_{sel\_step}$ for each additional time that access point m is detected. $TH_{sel}(m)$ may be limited to be greater than or equal to $TH_{sel\_init}$. The thresholds may be defined such that $TH_{det} \leq TH_{sel\_min} \leq TH_{sel}(m) \leq TH_{sel\_init}$. Access points may be included in the candidate set based on other thresholds and/or criteria.

In general, the candidate set may include zero, one, or multiple access points. If at least one access point is included in the candidate set, then the "best" access point may be selected for association by the terminal. The best access point may be (a) the candidate access point with the strongest filtered measurement, (b) the candidate access point with the strongest filtered measurement among all access points included in the detected set for the longest time or the most scan iterations, or (c) an access point chosen based on a weighting between the number of scan iterations the access point is included in the detected set and the filtered measurement. The terminal may attempt to associate with the best access point. If the association with this access point is unsuccessful for any reason, then the next best access point may be selected. Association may be attempted on one candidate access point at a time, starting with the best access point, until successful association is achieved, or association with all candidate access points has been attempted.

As shown in FIG. 6, the terminal may wait $T_{wait\_scan}$ seconds between scan iterations to achieve time diversity for the RSSI measurements for access points. In one design, the wait between scan iterations is a fixed value that is selected to provide good performance.

In another design, the wait $T_{wait\_scan}$ may be set as follows:

$$T_{wait\_scan,i} = \max\{T_{wait\_min}, T_{wait\_scan,i-1} - T_{step} \times D_i\}, \quad \text{Eq (3)}$$

where $T_{wait\_scan,i}$ is the amount of time to wait after the i-th scan iteration before performing the next scan iteration, $T_{step}$ is a reduction in the wait time, and $D_i$ is a decision as to whether or not to reduce the wait time after the i-th scan iteration. The decision $D_i$ may be based on RSSI measurements, e.g., $D_i=1$ for strong RSSI measurements and $D_i=0$ for weak RSSI measurements. In equation (3), the wait may be set to $T_{wait\_init}$ for the first scan iteration, may be reduced by $T_{step}$ for a subsequent scan iteration if $D_i=1$, and may be limited to $T_{wait\_min}$ or longer. In this design, the wait may progressively reduce after each scan iteration until $T_{wait\_min}$ is reached.

In yet another design, the wait $T_{wait\_scan}$ may be set as follows:

$$T_{wait\_scan,i} = \max\{T_{wait\_min}, T_{wait\_scan,i-1}/2^{D_i}\}. \quad \text{Eq (4)}$$

In equation (4), the wait may be set to $T_{wait\_init}$ for the first scan iteration, may be reduced for a subsequent scan iteration if $D_i>0$, and may be limited to $T_{wait\_min}$ or longer. For example, the wait may be reduced by one half if $D_i=1$ or retained if $D_i=0$. In this design, the wait may be reduced exponentially after each scan iteration until $T_{wait\_min}$ is reached.

In yet another design, the wait $T_{wait\_scan}$ may be set as follows:

$$T_{wait\_scan,i} = \max\{T_{wait\_min}, T_{wait\_scan,i-1} - T_{step,i}\}, \quad \text{Eq (5)}$$

where $T_{step,i}$ f is a step size for the i-th scan iteration. In equation (5), the wait may be set to $T_{wait\_init}$ for the first scan iteration, may be reduced by a variable step size $T_{step,i}$ for each subsequent scan iteration, and may be limited to $T_{wait\_min}$ or longer. For example, $T_{step,i}$ may be larger for strong RSSI measurements, which would result in a shorter wait, and may be smaller for weak RSSI measurements, which would result in a longer wait. $T_{step,i}$ may be determined based on various functions of the RSSI measurements, which may be for one or more of the strongest and/or oldest access points in the detected set.

As also shown in FIG. 6, the terminal may wait $T_{wait\_event}$ seconds between scan events. The wait between scan events may be a fixed value selected to provide good performance. This wait may also be a configurable value selected based on various factors such as the available battery power, etc.

Figure 8:
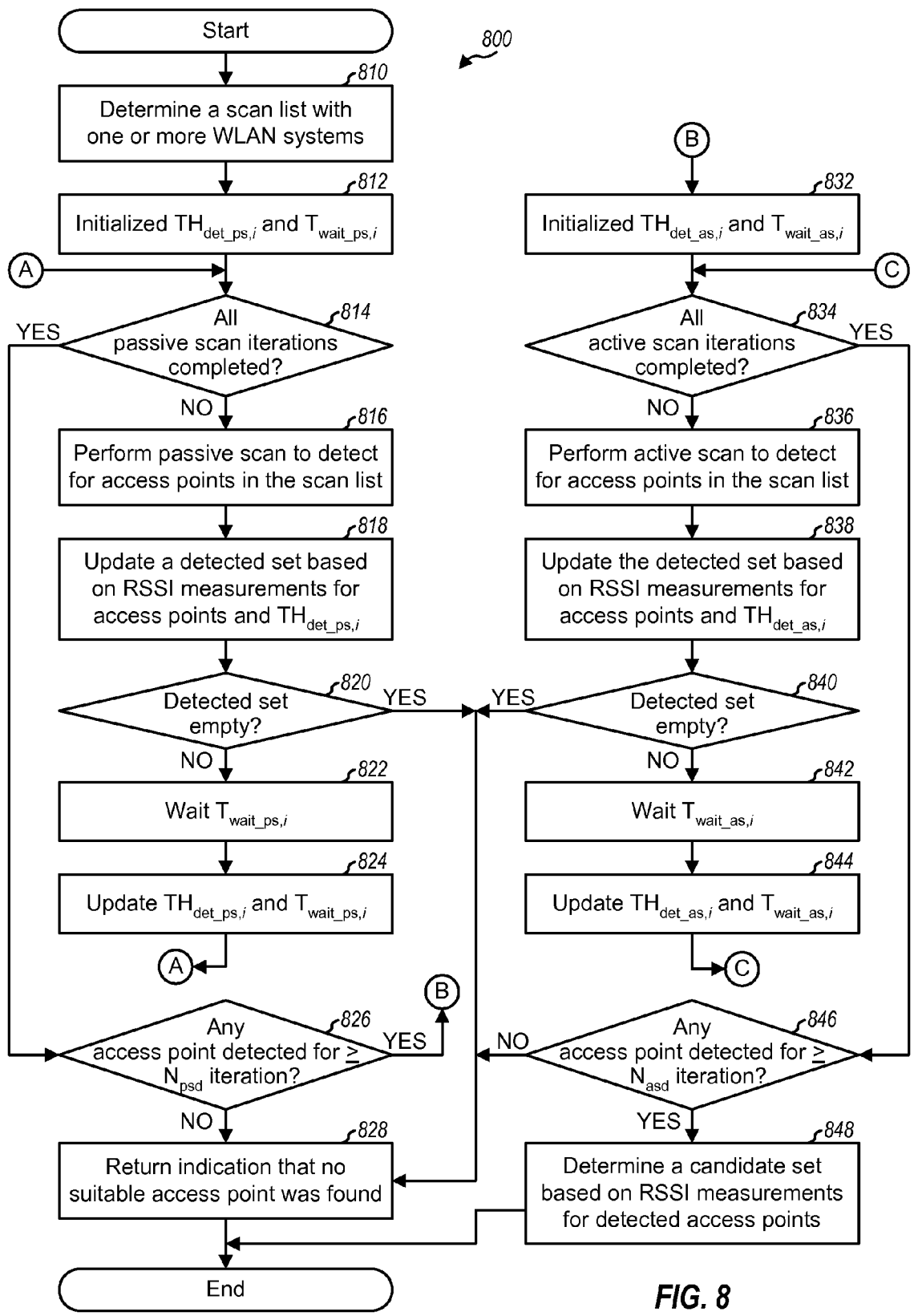
FIG. 8 shows another process for performing automatic scan.

FIG. 8 shows a process 800 for performing automatic scan to detect for WLAN systems. In process 800, $N_{ps}$ iterations of passive scan are first performed, then $N_{as}$ iterations of active scan are next performed for a given scan event, where in general $N_{ps} \geq 0$, $N_{ps} \geq 0$ and $N_{ps}+N_{as} \geq 2$. At the start of the scan event, a scan list containing one or more WLAN systems to detect for is determined (block 810).

For the passive scan, a detection threshold used to include access points in the detected set, $TH_{det\_ps,i}$, and the wait duration between passive scan iterations, $T_{wait\_ps,i}$, are initialized (block 812). A determination is made whether all $N_{ps}$ passive scan iterations are completed (block 814). If the answer is 'Yes', which is the case if $N_{ps}=0$, then the process proceeds to block 826. Otherwise, passive scan is performed to detect for access points in the scan list (block 816). The detected set is updated based on RSSI measurements for received access points and the $TH_{det\_ps,i}$ threshold, e.g., in accordance with any of the schemes described above (block 818). A determination is then made whether the detected set is empty (block 820). If the answer is 'Yes', then the process proceeds to block 828. Otherwise, the terminal waits $T_{wait\_ps,i}$ after the i-th passive scan iteration (block 822), then updates $TH_{det\_ps,i}$ and $T_{wait\_ps,i}$ as applicable (block 824), and then returns to block 814 for the next passive scan iteration. If all $N_{ps}$ passive scan iterations are completed and the answer is 'Yes' for block 814, then a determination is made whether any access point has been detected for at least $N_{psd}$ passive scan iterations, where $0 \leq N_{psd} \leq N_{ps}$ (block 826). The process proceeds to block 832 if the answer is 'Yes' and continues to block 828 otherwise.

For the active scan, a detection threshold used to include access points in the detected set, $TH_{det\_as,i}$ and the wait duration between active scan iterations, $T_{wait\_as,i}$ are initialized (block 832). A determination is made whether all $N_{as}$ active scan iterations are completed (block 834). If the answer is 'Yes', which is the case if $N_{as}=0$, then the process proceeds to block 846. Otherwise, active scan is performed to detect for access points in the scan list (block 836). The detected set is updated based on RSSI measurements for received access points and the $TH_{det\_as,i}$ threshold, e.g., in accordance with any of the schemes described above (block 838). A determination is then made whether the detected set is empty (block 840). If the answer is 'Yes', then the process proceeds to block 828. Otherwise, the terminal waits $T_{wait\_as,i}$ after the i-th active scan iteration (block 842), then updates $TH_{det\_as,i}$ and $T_{wait\_as,i}$ as applicable (block 844), and then returns to block 834 for the next active scan iteration. If all $N_{as}$ passive scan iterations are completed and the answer is 'Yes' for block 834, then a determination is made whether any access point has been detected for $N_{asd}$ active scan iterations, where $0 \leq N_{asd} \leq N_{as}$ (block 846). The process proceeds to block 848 if the answer is 'Yes' and continues to block 828 otherwise.

If the detected set if empty after any passive scan iteration ('Yes' for block 820) or after any active scan iteration ('Yes' for block 840), then an indication that no suitable access point was found is returned (block 828). If no access points are included in the detected set for at least $N_{psd}$ passive scan iterations and also for at least $N_{asd}$ active scan iterations, then a no suitable access point was found indication is also returned (block 828). If at least one access point has been included in the detected set for at least $N_{psd}$ passive scan iterations ('Yes' for block 826) and also for at least $N_{asd}$ active scan iterations ('Yes' for block 846), then the candidate set is determined based on the RSSI measurements obtained for the detected access points (block 848).

The $TH_{det\_ps,i}$ and $TH_{det\_as,i}$ thresholds may be fixed values or variable values that may be determined based on any of the schemes described above, e.g., as shown in equation (1). The wait durations $T_{wait\_ps,i}$ and $T_{wait\_as,i}$ may also be fixed values or variable values that may be determined based on any of the schemes described above, e.g., as shown in equation (3), (4) or (5).

For a given scan event, each scan iteration may provide a set of RSSI measurements for a set of access points received or detected in that scan iteration. A scan iteration may also return an empty set if no access points are received or detected. The RSSI measurements for a given access point may fluctuate widely across different scan iterations. The RSSI measurements for each access point may be filtered to obtain a more reliable measurement for that access point. The filtering may be achieved in various manners.

In one design, the filtering is based on equal averaging, as follows:

$$RSSI_{filtered}(m) = \frac{1}{N_m} \cdot \sum_{i=1}^{N_m} RSSI_i(m), \quad \text{Eq (6)}$$

where $RSSI_i(m)$ is an RSSI measurement for access point m in scan iteration i, $N_m$ is the number of RSSI measurements available for access point m, and $RSSI_{filtered}(m)$ is a filtered measurement for access point m.

An RSSI measurement may or may not be obtained for access point m in a given scan iteration. Thus, if $N_{scan}$ scan iterations are performed, then $N_m \leq N_{scan}$. Equation (6) gives equal weight to all RSSI measurements.

In another design, the filtering is based on exponential averaging with an infinite impulse response (IIR) filter, as follows:

$$RSSI_{filtered,i}(m) = \alpha \times RSSI_{filtered,i-1}(m) + (1-\alpha) \times RSSI_i(m) \quad \text{Eq (7)}$$

where $\alpha$ is a coefficient that determines the amount of filtering, and $RSSI_{filtered,i}(m)$ is a filtered measurement for access point m in scan iteration i.

Coefficient $\alpha$ may be any suitable value between 0 and 1, or $0 \leq \alpha \leq 1$. A small $\alpha$ value corresponds to less filtering, and a large $\alpha$ value corresponds to more filtering. A final filtered measurement may be obtained after all $N_m$ RSSI measurements have been exponentially averaged. Equation (7) gives greater weight to more recent RSSI measurements.

In yet another design, the filtering is based on a finite impulse response (FIR) filter, as follows:

$$RSSI_{filtered}(m) = \sum_{i=1}^{N_m} \alpha_i \times RSSI_i(m), \quad \text{Eq (8)}$$

where $\alpha_i$ is a weight for the RSSI measurement for access point m in scan iteration i, and $$1 = \sum_{i=1}^{N_m} \alpha_i.$$

In general, any set of weights may be used for the FIR filter. For example, the weights may be selected as $\alpha_i = 1/N_m$ for equal averaging in equation (6), or as $\alpha_i \propto \alpha^i$ for exponential averaging in equation (7). Equation (8) can give any weight to each RSSI measurement.

In yet another design, the filtering is based on equal or exponential averaging over a sliding window. The sliding window may cover $N_{win}$ latest RSSI measurements, where $N_{win}$ may be any suitable value, e.g., 3, 5, etc. Filtering is performed over the $N_{win}$ latest RSSI measurements, and older RSSI measurements are ignored.

In yet another design, the filtering is based on windowed mean exponentially weighted moving averaging (WMEWMA). In this design, an intermediate measurement is obtained for each scan iteration i by equal averaging $N_{win}$ latest RSSI measurements, e.g., as shown in equation (6). The intermediate measurements for different scan iterations are exponentially averaged, e.g., as shown in equation (7). WMEWMA is essentially a cascade of a boxcar mean followed by exponential averaging. The boxcar mean acts as a low-pass filter, while the exponential averaging allows the measurements to react reasonably quickly.

The filtering may also be performed in other manners with different averaging schemes or different combinations of averaging schemes.

While connected to a WLAN system in the in-traffic mode, the terminal may periodically perform background scan in order to maintain an up-to-date list of access points for possible handoff, if needed. The terminal may perform background scan for the current WLAN system, for any WLAN system in the preferred list, etc.

For background scan, the terminal may tune to frequency channels that are different from the frequency channel of the connected WLAN system. The terminal may perform active scan in order to keep the scan time short, which may be desirable for applications that send traffic periodically, such as Voice-over-Internet Protocol (VoIP). The terminal may perform background scan periodically in each background scan interval, which may be selected as follows:

$$T_{bg\_scan} = \frac{T_{shallow}}{N_{meas} \cdot N_{ch}}, \quad \text{Eq (9)}$$

where $N_{ch}$ is the number of frequency channels to scan, $N_{meas}$ is the number of RSSI measurements to obtain for a given access point, $T_{shahow}$ is a time window over which the RSSI measurements are filtered, and $T_{bg\_scan}$ is the background scan interval.

$T_{shadow}$ may be selected to account for fade caused by temporary obstructions in the wireless environment. For example, $T_{shadow}$ may be approximately 7 seconds to cover 20 feet of temporary obstruction at a pedestrian speed of 3 to 5 feet/second. A smaller $T_{shadow}$ results in more frequent background scan and higher battery consumption. $N_{meas}$ may be selected to account for variability in the RSSI measurements and may be set to 3, 5, or some other value.

The terminal may also monitor the performance of the associated access point to determine whether to perform handoff to another access point. Performance may be quantified by packet error rate (PER) for received packets and/or PER for transmitted packets, number of incorrectly received or lost beacons, RSSI measurements, etc. The PER may be computed over a sliding window, which may cover a predetermined number of most recent packets. The RSSI measurements may be filtered using any of the schemes described above. The RSSI measurements for access point m may also be filtered with a slow filter and a fast filter, as follows:

$$RSSI_{slow,i}(m) = \alpha_{slow} \times RSSI_{slow,i-1}(m) + (1-\alpha_{slow}) \times RSSI_i(m), \text{ and } RSSI_{fast,i}(m) = \alpha_{fast} \times RSSI_{fast,i-1}(m) + (1-\alpha_{fast}) \times RSSI_i(m) \quad \text{Eq (10)}$$

where $\alpha_{slow}$ and $\alpha_{fast}$ are coefficients for the slow and fast filters, respectively, and $RSSI_{slow,i}(m)$ and $RSSI_{fast,i}(m)$ are filtered measurements from the slow and fast filters, respectively, for access point m after the i-th RSSI measurement.

The slow filtered measurements may be used to make decisions on handoff. The fast filtered measurements may be used to determine the channel conditions for access point m. The fast filtered measurements may also be used to adjust the filter responses, e.g., to select the filter coefficients. A single coefficient value may be too slow to detect a fast falling pilot or too quick to hand off the terminal to another WLAN system. Two filters may be able to achieve both accurate detection of fast changing pilot and stable measurements for handoff. In one design, a fixed value is used for $\alpha_{fast}$ and a variable value is used for $\alpha_{slow}$. The $\alpha_{slow}$ value may be determined based on the fast filtered measurements. In one design, a fast filtered measurement is compared against a set of threshold values, and one of multiple possible $\alpha_{slow}$ values is selected based on the comparison result. If the fast filtered measurement is weak, then it may be desirable to adapt faster, which means that the slow filter should have a faster response and more weight (or a smaller $\alpha_{slow}$ value) should be used for the current RSSI measurement. Conversely, a larger $\alpha_{slow}$ value, and hence a slower filter response, may be used for a strong fast filtered measurement.

Handoff may be triggered by any criterion or any combination of criteria described above. The slow filtered measurements (if two filters are used) or the regular filtered measurements (if a single filter is used) may be compared against a measurement threshold, the PER may be compared against a PER threshold, and/or the number of incorrectly received beacons may be compared against a beacon threshold. Handoff may be triggered if the filtered measurements are below the measurement threshold, if the PER exceeds the PER threshold, and/or if the number of incorrectly received beacons exceeds the beacon threshold.

A list of access points that are candidates for handoff may be maintained. These access points may be selected based on various criteria such as quality of service (QoS) compatibility, security compatibility, RSSI, past history, etc. An access point may be a candidate for handoff if it can support the QoS and the security requested by the terminal and may be disqualified otherwise. The RSSI may be measured for the handoff candidate access points. The past history for a given access point may relate to success rate for previous handoffs to that access point. The best handoff candidate access point may be selected based on the RSSI, past history, etc. For example, a metric or score may be defined as follows:

$$S_{total}(m) = K_{rssi} \times S_{rssi}(m) + K_{hist} \times S_{hist}(m) + K_{qos} \times S_{qos}(m) + K_{sec} \times S_{sec}(m),$$ Eq (11)

where $S_{rssi}(m)$, $S_{hist}(m)$, $S_{qos}(m)$ and $S_{sec}(m)$ are scores for RSSI, past history, QoS and security, respectively, for access point m, $K_{rssi}$, $K_{hist}$, $K_{qos}$ and $K_{sec}$ are weights for RSSI, past history, QoS and security, respectively, and $S_{total}(m)$ is a total score for access point m.

The QoS and security scores may each be either 0 or 100. The total score may be 0 if either QoS or security score is 0. The RSSI score may range from 0 to 100, with larger value being assigned to higher RSSI measurement and vice versa. The past history score may be based on handoff success rate. For each handoff attempt for access point m, a value of 100 may be provided to a filter (e.g., an EWMA with a window size of 50) if handoff is successful, and a value of 0 may be provided if handoff is not successful. A default value (e.g., 50) may be used for the past history score if handoff to access point m has not been attempted for a predetermined number of times (e.g., 50 times). The weights $K_{rssi}$, $K_{hist}$, $K_{qos}$ and $K_{sec}$ may be any suitable values, e.g., each weight may be equal to 25 to give equal weight to all four parameters. Handoff to the best access point (e.g., with the best score) may be attempted whenever handoff is triggered. In one design, handoff may be performed if the filtered measurement (e.g., $RSSI_{slow,i}(m)$) for the best access point exceeds a minimum RSSI threshold and may be skipped otherwise. In another design, handoff to the best access point is performed regardless of any the filtered measurement.

Figure 9:
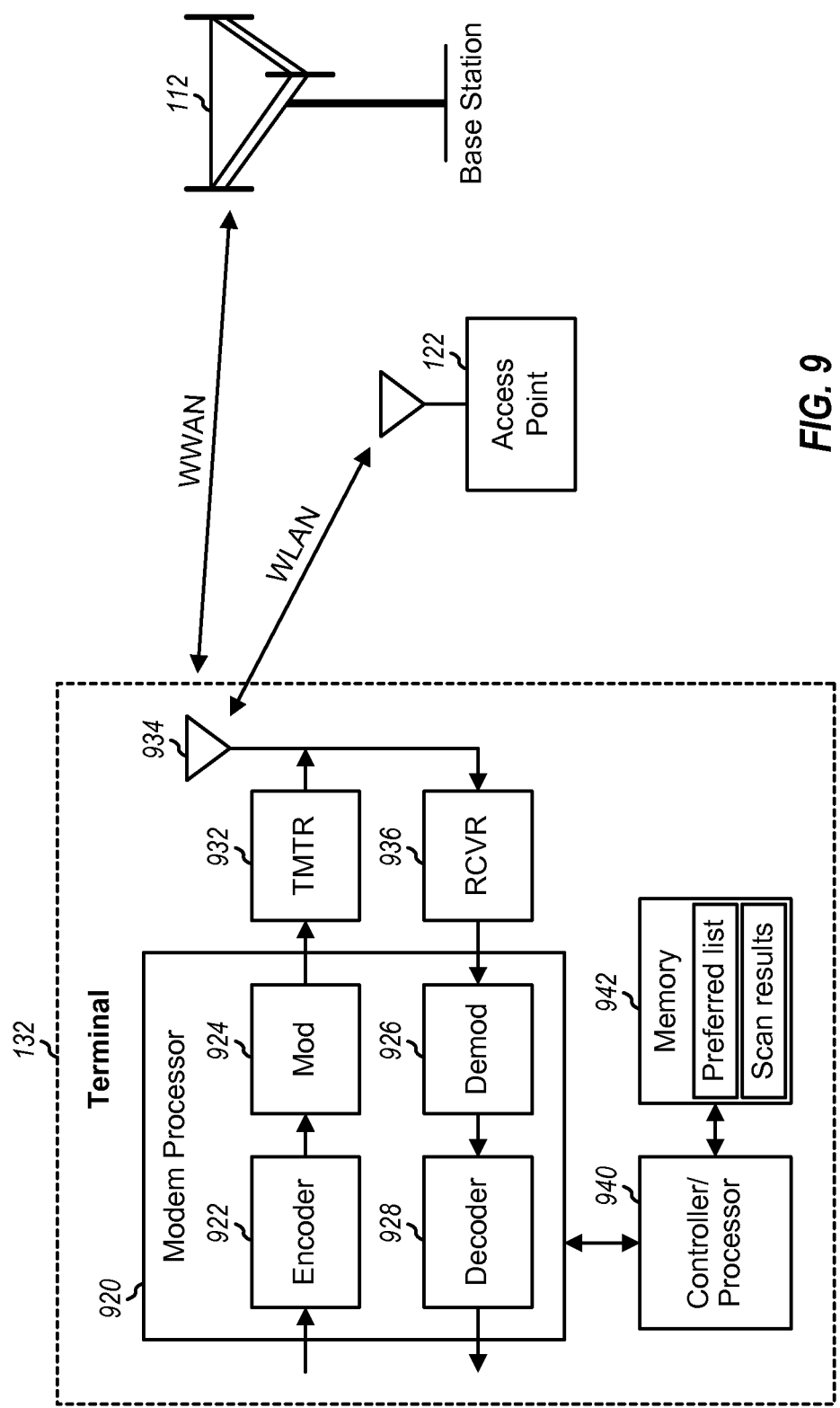
FIG. 9 shows a block diagram of the terminal.

FIG. 9 shows a block diagram of a design of terminal 130, which is capable of communicating with access points in WLAN systems and base stations in a WWAN (e.g., a cellular system). On the transmit path, data to be sent by terminal 130 is processed (e.g., formatted, encoded, and interleaved) by an encoder 922 and further processed (e.g., modulated and scrambled) by a modulator (Mod) 924 to generate data chips. The processing by encoder 922 and modulator 924 is dependent on the radio technology (e.g., 802.11, cdma2000, GSM, UMTS, etc.) for the wireless network to which data is sent. A transmitter (TMTR) 932 conditions (e.g., converts to analog, filters, amplifies, and frequency upconverts) the data chips and generates a radio frequency (RF) output signal, which is transmitted via an antenna 934.

On the receive path, RF signals transmitted by access points in WLAN systems and base stations in the WWAN are received by antenna 934 and provided to a receiver (RCVR) 936. Receiver 936 conditions (e.g., filters, amplifies, frequency downconverts, and digitizes) the received RF signal and generates data samples. A demodulator (Demod) 926 processes (e.g., descrambles and demodulates) the data samples to obtain symbol estimates. A decoder 928 processes (e.g., deinterleaves and decodes) the symbol estimates to obtain decoded data. The processing by demodulator 926 and decoder 928 is complementary to the processing by the modulator and encoder at the access point or base station. Encoder 922, modulator 924, demodulator 926 and decoder 928 may be implemented by a modem processor 920.

A controller/processor 940 directs the operation of various processing units at terminal 130. A memory 942 stores program codes and data for terminal 130. Controller/processor 940 may implement process 600 in FIG. 6, process 700 in FIG. 7, process 800 in FIG. 8, and/or other processes for WLAN system scanning and selection. Memory 942 may store information for scan such as the various list and sets shown in FIG. 5, scan results, etc. Memory 942 may also store a table of MCC values, the associated countries, and information used for scanning, e.g., frequency channels, output power levels, etc.

The techniques described herein may be implemented by various means. For example, these techniques may be implemented in hardware, firmware, software, or a combination thereof. For a hardware implementation, the processing units used to perform WLAN system scanning and selection may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, a computer, or a combination thereof.

For a firmware and/or software implementation, the techniques may be implemented with modules (e.g., procedures, functions, etc.) that perform the functions described herein. The firmware and/or software codes may be stored in a memory (e.g., memory 942 in FIG. 9) and executed by a processor (e.g., processor 940). The memory may be implemented within the processor or external to the processor.

An apparatus implementing the techniques described herein may be a stand-alone unit or may be part of a device. The device may be (i) a stand-alone integrated circuit (IC), (ii) a set of one or more ICs that may include memory ICs for storing data and/or instructions, (iii) an ASIC such as a mobile station modem (MSM), (iv) a module that may be embedded within other devices, (v) a cellular phone, wireless device, handset, or mobile unit, (vi) etc.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed is:

1. An apparatus comprising:
a processor configured to select a number of scan iterations that vary with a received signal strength indicator, to perform the number of scan iterations to detect for access points and to identify candidate access points for association based on results of performing the number of scan iterations;
the processor further configured to select a scan type for each of the number of scan iterations, to perform each scan iteration based on the scan type selected for the scan iteration, and to wait for a wait-scan time between each scan iteration;
wherein the wait-scan time at a current scan iteration is a maximum of a wait minimum time and a wait-scan time for a scan iteration previous to the current scan iteration provided a decision is made not to reduce wait time after the current scan iteration; and
wherein the wait-scan time at the current scan iteration is a maximum of the wait minimum time and the wait-scan time for the scan iteration previous to the current scan iteration reduced by a step size time provided a decision is made to reduce wait time after the current scan iteration.

2. The apparatus of claim 1, wherein the selected scan type for each scan iteration indicates passive scan or active scan.

3. The apparatus of claim 1, wherein the selected scan type for each scan iteration indicates at least one frequency channel to scan.

4. The apparatus of claim 1, wherein the processor is configured to perform active scan for at least one of the number of scan iterations if active scan is permitted for current location of the apparatus, and to perform passive scan for all of the number of scan iterations if active scan is not permitted for the current location.

5. The apparatus of claim 4, wherein the processor is configured to determine whether active scan is permitted for the current location based on a beacon frame received from an access point.

6. The apparatus of claim 4, wherein the processor is configured to determine whether active scan is permitted for the current location based on a transmission received from a base station in a cellular network.

7. The apparatus of claim 1, wherein for each scan iteration the processor is configured to obtain signal strength measurements for received access points and to identify detected access points based on the signal strength measurements for the received access points.

8. The apparatus of claim 7, wherein for each scan iteration the processor is configured to declare a received access point as a detected access point if a signal strength measurement obtained for the received access point in the scan iteration exceeds a detection threshold.

9. The apparatus of claim 7, wherein for each scan iteration the processor is configured to filter signal strength measurements obtained for each received access point for current and prior scan iterations, and to declare a received access point as a detected access point if a filtered signal strength measurement for the received access point exceeds a detection threshold.

10. The apparatus of claim 7, wherein for each scan iteration the processor is configured to determine a variable detection threshold for the scan iteration and to identify the detected access points based on the signal strength measurements for the received access points and the variable detection threshold.

11. The apparatus of claim 1, wherein the processor is configured to obtain signal strength measurements for access points detected in the number of scan iterations, and to identify the candidate access points based on the signal strength measurements for the detected access points.

12. The apparatus of claim 11, wherein the processor is configured to declare a detected access point as a candidate access point if signal strength measurements obtained for the detected access point exceed a detection threshold for at least a predetermined number of scan iterations.

13. The apparatus of claim 11, wherein the processor is configured to filter signal strength measurements obtained for each detected access point in the number of scan iterations, and to declare a detected access point as a candidate access point if a filtered signal strength measurement for the detected access point exceeds a selection threshold.

14. The apparatus of claim 11, wherein the processor is configured to determine a variable selection threshold for each detected access point based on number of scan iterations in which the detected access point has sufficiently strong signal strength measurements, and to determine whether each detected access point is a candidate access point based on signal strength measurements and the variable selection threshold for the detected access point.

15. The apparatus of claim 1, wherein the processor is configured to select the number of scan iterations further based on signal strength measurements for the detected access points.

16. The apparatus of claim 1, wherein the processor is configured to wait a particular time duration between scan iterations.

17. A method comprising:
selecting a number of scan iterations that vary with a received signal strength indicator;
using a controller to perform the number of scan iterations to detect for access points;
identifying candidate access points for association based on results of the number of scan iterations;
selecting a scan type for each of the number of scan iterations;
performing each scan iteration based on the scan type selected for the scan iteration;
waiting for a wait-scan time between each scan iteration, wherein the wait-scan time vary with scan iteration;
wherein the wait-scan time at a current scan iteration is a maximum of a wait minimum time and a wait-scan time for a scan iteration previous to the current scan iteration provided a decision is made not to reduce wait time after the current scan iteration; and
wherein the wait-scan time at the current scan iteration is a maximum of the wait minimum time and the wait-scan time for the scan iteration previous to the current scan iteration reduced by a step size time provided a decision is made to reduce wait time after the current scan iteration.

18. The method of claim 17, wherein the controller performs the number of scan iterations by:
performing active scan for at least one of the number of scan iterations if active scan is permitted for current location of a terminal, and
performing passive scan for all of the number of scan iterations if active scan is not permitted for the current location.

19. The method of claim 17, wherein the controller performs the number of scan iterations by:
- obtaining signal strength measurements for received access points, and
- identifying detected access points based on the signal strength measurements for the received access points.

20. The method of claim 17, wherein the identifying the candidate access points comprises:
- obtaining signal strength measurements for access points detected in the number of scan iterations, and
- identifying the candidate access points based on the signal strength measurements for the detected access points.

21. An apparatus comprising:
- means for selecting a number of scan iterations that vary with a received signal strength indicator;
- means for performing the number of scan iterations to detect for access points;
- means for identifying candidate access points for association based on results of the number of scan iterations;
- means for waiting a wait-scan time between each scan iteration, wherein the wait-scan time at a current scan iteration is a maximum of a wait minimum time and a wait-scan time for a scan iteration previous to the current scan iteration provided a decision is made not to reduce wait time after the current scan iteration; and
- wherein the wait-scan time at the current scan iteration is a maximum of the wait minimum time and the wait-scan time for the scan iteration previous to the current scan iteration reduced by a step size time provided a decision is made to reduce wait time after the current scan iteration.

22. The apparatus of claim 21, wherein the means for performing the number of scan iterations comprises:
- means for selecting a scan type for each of the number of scan iterations, and
- means for performing each scan iteration based on the scan type selected for the scan iteration.

23. The apparatus of claim 21, wherein the means for performing the number of scan iterations comprises:
- means for obtaining signal strength measurements for received access points, and
- means for identifying detected access points based on the signal strength measurements for the received access points.

24. The apparatus of claim 21, wherein the means for identifying the candidate access points comprises:
- means for obtaining signal strength measurements for access points detected in the number of scan iterations, and
- means for identifying the candidate access points based on the signal strength measurements for the detected access points.

25. A non-transitory computer-readable medium for storing instructions to:
- select a number of scan iterations that vary with a received signal strength indicator;
- perform the number of scan iterations to detect for access points, and identify candidate access points for association based on results of the number of scan iterations;
- select a scan type for each of the number of scan iterations;
- perform each scan iteration based on the scan type selected for the scan iteration;
- wait a wait-scan time between each scan iteration;
- wherein the wait-scan time at a current scan iteration is a maximum of a wait minimum time and a wait-scan time for a scan iteration previous to the current scan iteration provided a decision is made not to reduce wait time after the current scan iteration; and
- wherein the wait-scan time at the current scan iteration is a maximum of the wait minimum time and the wait-scan time for the scan iteration previous to the current scan iteration reduced by a step size time provided a decision is made to reduce wait time after the current scan iteration.

26. The non-transitory computer-readable medium of claim 25, and further for storing instructions to:
- obtain signal strength measurements for received access points, and
- identify detected access points based on the signal strength measurements for the received access points.

27. The non-transitory computer-readable medium of claim 25, and further for storing instructions to:
- obtain signal strength measurements for access points detected in the number of scan iterations, and
- identify the candidate access points based on the signal strength measurements for the detected access points.

* * * * *